May 23, 1933.　　　A. L. WHITESIDE　　　1,910,270
POWER TRANSMITTING DEVICE
Filed Jan. 15, 1931
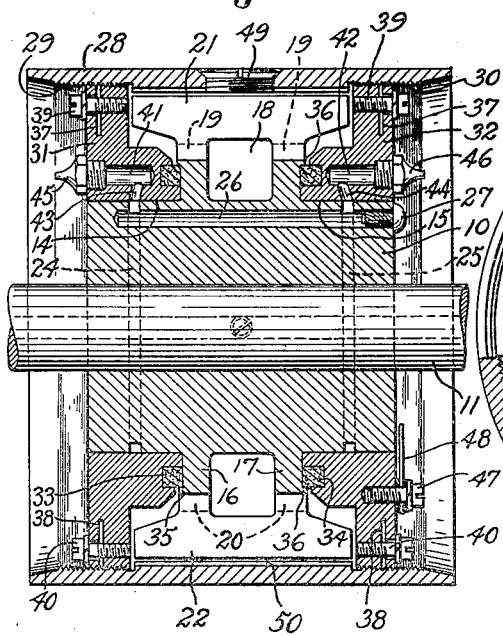
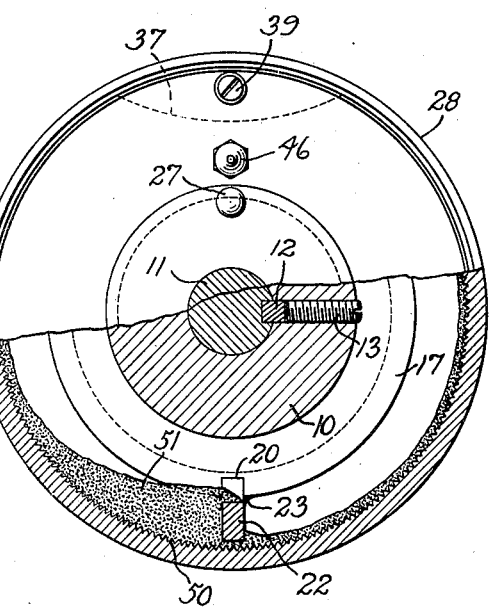
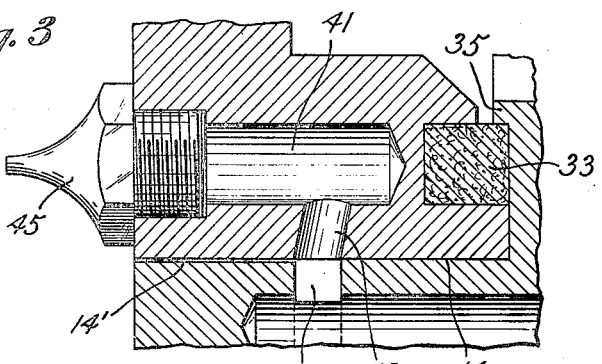
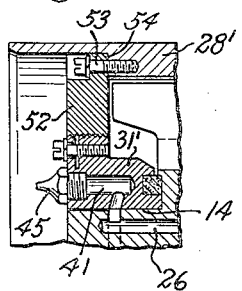
INVENTOR
Arthur L. Whiteside
BY
ATTORNEY Patented May 23, 1933

1,910,270

UNITED STATES PATENT OFFICE

ARTHUR L. WHITESIDE, OF EAST ORANGE, NEW JERSEY, ASSIGNOR TO PULVIS AKTIEN-GESELLSCHAFT, OF GLARUS, SWITZERLAND, A CORPORATION OF SWITZERLAND

POWER TRANSMITTING DEVICE

Application filed January 15, 1931. Serial No. 508,818.

My invention relates to power transmission. More specifically my invention relates to clutch mechanism for releasably coupling together driving and driven members adapted to rotate at the same speed, and is in the nature of an improvement upon the type of clutch disclosed in the copending application Serial No. 411,029, filed December 2, 1929, in the name of Carl August Rudqvist.

In the type of clutch above referred to, an inner rotary driving member is provided with radially extending driving blades located in an annular chamber formed between the inner driving member and an outer driven member, the latter member being in the form of a casing surrounding the inner member. The annular space between the two members is partially filled with finely divided metallic material, preferably in the form of ferrous balls of such small diameter that the material is in effect a powder. Such powder preferably consists of substantially perfectly spherical balls of substantially uniform size, and while I believe balls between 5 and 60 thousandths of an inch in diameter to be effective, the balls should be as small as conveniently possible in order to provide a powder of relatively great density. I have found that commercial chilled shot refined to remove defective balls and to retain balls of from 20 to 23 thousandths of an inch in diameter to be very effective. Suitable refined powder consisting of balls of smaller diameter may be even more effective, but such powder is more difficult to obtain in commercial quantities.

Stated generally, drive through the clutch is effected by causing the powder in the clutch to form in drifts ahead of the blades of the driving member, these drifts permitting relative rotation between the driving and driven members until centrifugal force, acting on the drifts, converts them into relatively solid masses adhering to the inner surfaces of the driven member and providing driving abutments for the blades on the driving member capable of transmitting a predetermined desired amount of power at a given speed of the driving member.

Satisfactory operation of a clutch of the type above described depends upon a number of different factors, and the general object of the present invention is to provide an improved form of clutch construction in which numerous novel features are incorporated, all of which contribute to an improved operation of the clutch, as will hereinafter more fully appear.

Amongst the more specific objects of the invention are to provide, in a clutch of the character described, an improved form of adjustable driven member, to provide an improved form of driving member in which the blades carried thereby may be readily renewed and in which exact balance is readily obtained without resorting to difficult or special machining operations, to provide improved means for lubricating the clutch including improved means for preventing lubricant from reaching the space containing the metallic powder, and to provide a novel form of audible telltale for indicating relative rotation between the driving and driven members.

The nature and advantages of the invention, together with the more specific objects thereof, may best be understood from a consideration of the ensuing description of a preferred form of apparatus for carrying the invention into effect, which is illustrated in the accompanying drawing forming a part of this specification.

In the drawing, Fig. 1 is a central longitudinal section illustrating the improved clutch;

Fig. 2 is an end view partly in elevation and partly in section of the clutch shown in Fig. 1;

Fig. 3 is an enlarged detail view of part of the structure shown in Fig. 1;

Fig. 4 is an enlarged detail view of part of the structure shown in Fig. 1, but with the parts illustrated in different relative positions; and Fig. 5 is a section of part of a modified form of clutch.

Referring now to the drawing, the driving member of the clutch comprises a hub 10 mounted on the driving shaft 11 and secured against rotation on the shaft by key 12, which may be advantageously locked in position with a set screw 13. The hub 10 has end portions providing journals 14 and 15 and a central portion of larger diameter, which in the present instance is in the form of axially spaced flanges 16 and 17, forming between them a groove 18. Flanges 16 and 17 are notched or grooved in axial alignment at points symmetrically spaced with respect to the perimeters of the flanges. In the present instance each of the flanges is grooved at diametrically opposed points 19 and 20.

Driving blades 21 and 22 are set respectively in the grooves 19 and 20, these blades extending radially outwardly and being positioned axially of the hub. The hub and blades are preferably both of steel, the blades being of hardened or other special wear-resisting form of steel, and the two parts are secured by welding along the edges of the grooves as at 23 in Fig. 2. By welding I mean to include all equivalent fusion joining means such as grazing, which may be employed when the hub or blades, or both, are of metals not adapted to be welded.

While in the embodiment shown, a substantially solid hub 10 is shown, other forms of internal construction for the hub may be employed within the scope of the invention.

Annular lubricating channels 24 and 25 are provided substantially midway of the journals 14 and 15 respectively, these channels being connected within the hub 10 through the medium of a bore 26 of relatively large diameter and extending generally axially of the hub from one end thereof. Bore 26 is closed at the end of the hub, preferably by means of a drive screw having a hemispherical head 27 extending axially from the end face of the hub. Each of the journals 14 and 15 is of slightly reduced diameter axially outside the respective grooves 24 and 25, as indicated in exaggerated form at 14′ in Fig. 3. This reduction in diameter of portions of the journals is preferably only a very few thousandths of an inch, and is provided for a purpose which will hereinafter appear.

The driven member comprises a casing formed by a sleeve 28 internally threaded at its ends at 29 and 30 to receive adjustable end plates 31 and 32 respectively, which provide the end walls of the casing and which are adapted to engage respectively journals 14 and 15 on hub 10. End plates 31 and 32 are grooved on their axially inner faces to receive packing members 33 and 34, which members are adapted to bear against the axially outer faces of flanges 16 and 17 respectively. Preferably the flanges are provided with axially extending annular shoulders 35 and 36, which assist in retaining the packing members against spreading due to centrifugal force. It is important that the packing members be jointless and I prefer to employ endless felt rings for this purpose.

Each of the end plates 31 and 32 is slotted inwardly at its circumference and the slotted portions of these plates provide axially resilient parts adapted to be drawn together to lock the end plates in adjusted position in the threaded portions of sleeve 28.

In the clutch illustrated I have shown the end plates provided with diametrically opposed slots 37 and 38 with clamp screws 39 and 40 passing through the respective slotted portions of the plates. Obviously the number of slotted clamping portions may be varied.

Lubricant is introduced into the bore 26 and channels 24 and 25 through one or more passages in the end plates. In the preferred form of construction the end plates are provided with axial bores 41 and 42 respectively, these bores communicating by way of radial bores 43 and 44 with the bore 26, preferably at points where the latter bore communicates with channels 24 and 25.

At the ends of bores 41 and 42 are closures formed by fittings 45 and 46 of known type, adapted to cooperate with a suitable gun for forcing lubricant to the journals.

One of the end plates has secured thereto, as by one or more studs 47, a spring steel strip 48 which extends radially inwardly so as to be struck by the head 27 of the closure member for bore 26. When head 27 passes the strip 48 the latter member is moved to the position shown in dot-and-dash lines in Fig. 4, and this contact results in an audible metallic click which serves as a telltale to indicate that relative rotation is occurring between the two major parts of the clutch.

Sleeve 28 is provided with a suitable plug 49 to permit the insertion in and removal from the clutch of the metallic powder which coacts with the clutch members to transmit power through the clutch.

Intermediate the threaded ends sleeve 28 is preferably provided with a roughened interior surface, which may advantageously be in the form of axially extending serrations 50.

The annular space in which the driving blades are located is partially filled with a metallic powder 51, adapted to form drifts ahead of the blades 21 and 22 and to transmit power in the manner more particularly described in application Serial No. 411,029 hereinabove referred to.

Fig. 5 illustrates a modified form of construction adapted particularly for clutches of relatively large diameter. In this form the casing has inwardly extending flange portions 52 shown as separate end rings secured by means of studs 53 in recesses 54 in the ends of sleeve 28′. Obviously one of the flange portions may be integral with the sleeve but both may be made integral only in case a split housing is used and I prefer to use the construction illustrated. The end plates, one of which is shown at 31', are screwed into internal threads in the flange portions which correspond to the threads 29 and 30 in Fig. 1 and the remainder of the construction is similar to that already described.

Among the advantages to be derived from my improved construction the following are to be noted:

It has been found that after considerable usage, the driving blades in clutches of the type to which the present invention relates are subject to wear at their axially outer ends, so that there is an undue tendency for the powder to pass the blades due to the increased clearance between the blades and the outer casing. This wear in time becomes sufficient to reduce the maximum power transmitting capacity of the clutch. In the improved form of construction disclosed, a worn clutch may readily be restored to its original capacity by burning off the welds 23 and inserting new blades. This welded construction also permits ready manufacture of a perfectly balanced driving member, since the annular flanged construction permits the hub 10 to be machined all over, and the insertion of separate finished driving blades produces a symmetrical and balanced driving member.

If the clutch is to function properly, it is highly important that the powder be maintained in substantially dry condition. I have found that a most suitable material for use in these clutches is a refined commercial chilled shot containing nothing but substantially perfectly spherical balls, the surfaces of which are coated with a film of graphite, the quantity of the latter being only sufficient to prevent abrasive metal to metal contact between individual balls and not sufficient to destroy the dry powdery characteristic of the material. The necessary dry powdery characteristic of the material is destroyed by contamination with any appreciable quantity of lubricant such as grease or oil, and in the improved form of construction the packing between the driving and driven members effectively prevents the entrance of lubricant into the annular chamber between the members. The effectiveness of the packing is contributed to by the adjustable end plates, which, as will be observed, may readily be clamped in any desired position of axial adjustment. In this connection it is to be noted that while for the sake of uniformity and ease in manufacture I prefer to make both the end walls of the casing in the form of separable adjustable plates, the desired adjustability with respect to end play may be secured with but one of the end walls in the form of an adjustable plate.

I have further found it practically necessary to provide a reservoir for lubricant and also to provide means for positively ensuring the lubricant reaching the journals of the clutch. My improved construction provides for such reservoir and also for pressure lubrication, but the possibility of forcing lubricant past the packing members is eliminated by the increased clearance provided by the outer journal portions of reduced diameter, which serve as relief channels for excess lubricant in case it is attempted to force too great a quantity of lubricant into the clutch.

As will be apparent from the drawing, my improved structure provides a mechanism which is inherently in rotational balance, as is essential in clutches of this type, particularly when they are used for the transmission of power at high rotational speeds.

The audible telltale performs three functions. It gives automatic indication of the time necessary for the driving member to accelerate the driven member to operating speed, from which indication proper adjustment of the clutch, as by varying the quantity of powder therein, can readily be made. Also, failure of the clutch to establish or to continue to effect synchronous drive between the driving member and the driven member under normal operating conditions, due to wear or other cause, is immediately indicated, as are overload conditions causing the clutch to release and then pick up the drive upon cessation of the overload.

The end plates bearing on the hub journals are preferably of material suitable as a bearing material, for example bronze when a steel or iron hub is used, although they may be of other material provided with suitable bushings, and in the form shown in Fig. 5, the end plates each may conveniently be made in one piece of bearing material, which construction is preferable, with the outer flange portions or rings of less expensive material. Furthermore, it is difficult and expensive to satisfactorily thread sleeves and plates of large diameter and the modified construction of Fig. 5 permits threads of relatively small and convenient diameter to be used in clutches of large diameter.

From the foregoing description it will be apparent that many changes and modifications in the specific features of the design may be made without departing from the invention, which is to be understood as including all such structures as may fall within the scope of the appended claims.

What I claim is:

1. In a clutching device, a driving member comprising a hub having end portions providing journals and a central portion carrying driving blades, a driven member comprising a casing having end walls and forming a closed annular chamber for said blades and for finely divided material, said end walls engaging said journals, and means for supplying lubricant to said journals, there being greater clearance between the hub and the end walls at the axially outer ends of the journals than at the axially inner ends thereof.

2. In a clutching device, a driving member comprising a hub having end portions providing journals and a central portion carrying driving blades, a driven member comprising a casing having end walls forming a closed annular chamber for said blades and for finely divided material, said end walls engaging said journals, means comprising annular channels intermediate the ends of the journals for supplying lubricant to the journals, there being a greater clearance between the hub and the end walls at the axially outer ends of the journals than at the axially inner ends thereof.

3. In a clutching device, a driving member comprising a hub having cylindrical end portions providing journals and a central portion of larger diameter than said journals, a driven member comprising a casing having annular end walls engaging said journals, annular packing between said end walls and said central portion, means for supplying lubricant to said journals comprising annular channels intermediate the ends of the journals, the portions of the bearings formed by said journals and said end walls and extending outwardly from said channels having greater clearance than the portions of said bearings between said journals and said packing.

4. In a clutching device, a driving member comprising a hub having cylindrical end portions providing journals and a central portion of larger diameter than said journals, a driven member comprising a casing having annular end walls engaging said journals, annular packing between said end walls and said central portion, means for supplying lubricant to said journals comprising annular channels intermediate the ends of the journals, the portions of the journals axially outside the channels being of less diameter than the portions of the journals axially inside the channels, and the radially inner surfaces of said end walls being of uniform diameter.

5. In a clutching device of the character described, a metal hub having axially spaced radially extending flanges and a plurality of axially arranged metal plates welded to said flanges and symmetrically spaced with respect to the perimeter of the flanges.

6. In a clutching device of the character described, a steel hub having axially spaced radially extending flanges, said flanges having axially aligned grooves therein symmetrically spaced with respect to the perimeter of the radially outer surfaces of said flanges and extending inwardly from said surfaces, and steel plates seated in said grooves and welded to the flanges.

7. In a clutching device of the character described, a driving member comprising a hub, a driven member comprising a casing having an end wall and an audible telltale for indicating relative rotation between said members comprising a rounded projection secured to one of said members and a resilient metallic strip secured to the other of said members, parts of both of said members being in the same transverse plane and radially the same distance from the axis of rotation of said device.

8. In a clutching device of the character described, a driving member comprising a hub having end portions providing journals, a driven member comprising a casing having end walls engaging said journals, said hub having a channel extending axially from one end thereof to provide a reservoir for lubricant for said journals, a closure member for said channel having a head protruding from said end and a yieldable member secured to one of said end walls and adapted to be struck by said head upon relative rotation of the driving member with respect to the driven member.

9. In a clutching device of the character described, a driving member comprising a hub having end portions providing journals, a driven member comprising a casing having end walls engaging said journals, said hub having a channel extending axially from one end thereof to provide a reservoir for lubricant for said journals, a closure member for said channel having a rounded head protruding from said end and a spring steel member secured to one of said end walls and extending radially inwardly so as to be struck by said head to provide an audible telltale for indicating relative rotation between the driving member and the driven member.

10. In a clutching device, a driving member comprising a hub having blades thereon and a driven member comprising a casing having inwardly extending internally threaded flange portions at its ends and annular end plates screwed into said flange portions and bearing on said hub, said casing being adapted to form with said hub a closed annular chamber for said blades and for a quantity of finely divided material adapted to cooperate with the blades to transmit power from the driving member to the driven member.

11. In a clutching device, a driving member comprising a hub having blades thereon and a driven member comprising a casing having a sleeve, separable internally threaded end rings secured to said sleeve and annular end plates screwed into said end rings and bearing on said hub, said casing being adapted to form with said hub a closed annular chamber for said blades and for a quantity of finely divided material adapted to cooperate with the blades to transmit power from the driving member to the driven member.

In testimony whereof I have affixed my signature.

ARTHUR L. WHITESIDE.